(12) United States Patent
Comaniciu et al.

(10) Patent No.: US 7,446,798 B2
(45) Date of Patent: Nov. 4, 2008

(54) REAL-TIME OBSTACLE DETECTION WITH A CALIBRATED CAMERA AND KNOWN EGO-MOTION

(75) Inventors: Dorin Comaniciu, Princeton Jct., NJ (US); Binglong Xie, Bethlehem, PA (US)

(73) Assignee: Siemens Corporate Research, Inc., Princeton, NJ (US)

( * ) Notice: Subject to any disclaimer, the term of this patent is extended or adjusted under 35 U.S.C. 154(b) by 1089 days.

(21) Appl. No.: 10/770,044

(22) Filed: Feb. 2, 2004

(65) Prior Publication Data

US 2004/0183905 A1  Sep. 23, 2004

Related U.S. Application Data

(60) Provisional application No. 60/445,203, filed on Feb. 5, 2003.

(51) Int. Cl.
  *H04N 7/18* (2006.01)
(52) U.S. Cl. .................................... 348/148; 348/143
(58) Field of Classification Search ................ 348/143, 348/148; 382/104; 701/1, 301
  See application file for complete search history.

(56) References Cited

U.S. PATENT DOCUMENTS 6,370,475 B1 * 4/2002 Breed et al. ................. 701/301
6,445,809 B1 * 9/2002 Sasaki et al. ................. 382/104
6,704,621 B1 * 3/2004 Stein et al. ..................... 701/1

OTHER PUBLICATIONS

Enkelmann W: "Obstacle Detection by Evaluation of Optical Flow Fields From Image Sequences" Image and Vision Computing, Guildford, GB, vol. 9, No. 3, Jun. 1991, pp. 160-168, XP009033182 ISSN: 0262-8856 the whole document.

Kruger W et al: "Real-time estimation and tracking of optical flow vectors for obstacle detection" Intelligent Vehicles '95 Symposium. Proceedings of the Detroit, MI, USA Sep. 25-26, 1995, New York, NY, USA, IEEE, US, Sep. 25, 1995, pp. 304-309, XP010194134 ISBN: 0-7803-2983-X the whole document.

Attolico G et al: "Shape recovery of collision zones for obstacle avoidance" Intelligent Robots and Systems '91. Intelligence for Mechanical Systems, Proceedings IROS '91. IEEE/RSJ International Workshop on Osaka, Japan Nov. 3-5, 1991, New York, NY, USA,IEEE, US, Nov. 3, 1991, pp. 837-841, XP010047248 ISBN: 0-7803-0067-X the whole document.

Hu Z et al: Tracking cycle: a new concept for simultaneous tracking of multiple moving objects in a typical traffic scene Intelligent Vehicles Symposium, 2000. IV 2000. Proceedings of the IEEE Dearborn, MI, USA Oct. 3-5, 2000, Piscataway, NJ, USA,IEEE, US, Oct. 3, 2000, pp. 233-239, XP010528942 ISBN: 0-7803-6363-9 the whole document.

(Continued)

*Primary Examiner*—Allen Wong
(74) *Attorney, Agent, or Firm*—Donald B. Paschburg; F. Chau & Associates, LLC

(57) ABSTRACT

A method and system of real-time obstacle detection from a moving vehicle is provided. The method and system use a calibrated image capturing device. The method and system use a motion estimation technique to pick points with reliable image motion flows, and performs very fast sparse matching between the image motion flows and true motion flows calculated from the ego-motion of the image capturing device. Any mismatch between the image motion flows and the true motion flows are verified over time to achieve robust obstacle detection.

19 Claims, 5 Drawing Sheets

OTHER PUBLICATIONS

Thomanek F et al: Obstacle Detection, Tracking And State Estimation For Autonomous Road Vehicle Guidance Proceedings of the IEEE/RSJ International Conference on Intelligent Robots and Systems. Raleigh, NC., Jul. 7-10, 1992, New York, IEEE, US, vol. vol. 1 -. Jul. 7, 1992, pp. 1399-1406, XP010223197 ISBN: 0-7803-0738-0 p. 1401, col. 2-p. 1403, col. 1.

Santos-Victor J et al: "On the design of visual behaviors for autonomous systems" Industrial Electronics, 1997. ISIE '97., Proceedings of the IEEE International Symposium on Guimaraes, Portugal Jul. 7-11, 1997, New York, NY, USA,IEEE, US, Jul. 7, 1997, pp. SS53-SS59, XP010265139 ISBN: 0-7803-3936-3 p. SS53, col. 1 -p. SS55, col. 2.

Heinrich Niemann, et al. "Integrated Motion and Geometry Based Obstacle Detection in Image Sequences of Traffic Scenes" Proceedings SPIE, 2736, 1996 pp. 228-239.

* cited by examiner

REAL-TIME OBSTACLE DETECTION WITH A CALIBRATED CAMERA AND KNOWN EGO-MOTION

CROSS REFERENCE TO RELATED APPLICATIONS

This application claims the benefit of U.S. Provisional Application Ser. No. 60/445,203, filed on Feb. 5, 2003, which is incorporated by reference herein in its entirety.

BACKGROUND OF THE INVENTION

1. Field of the Invention

The present invention relates to the field of obstacle detection, and, more particularly, to real-time obstacle detection with a calibrated camera and known ego-motion.

2. Description of the Related Art

Real-time obstacle detection in a moving vehicle is a key component for autonomous driving and computer vision-based driving assistance. Obstacle detection in autonomous driving and driving assistance is often used to avoid collision. An obstacle is generally context dependent. That is, although an obstacle on the road is usually a vehicle, it can be something else, such as a large rock.

In Serge Beucher et al., Road Monitoring and Obstacle Detection System by Image Analysis and Mathematical Morphology, Proceedings 5th EAEC (European Automobile Engineers Cooperation) International Congress, "The European Automotive Industry Meets the Challenges of the Year 2000", Strasbourg, 21-23 Jun. 1995, March 1995, obstacle detection is performed with morphological operations using the road/lane detection results. The obstacle is assumed to be a vehicle with two distinct features: (a) it has lower dark parts such as a bumper or shadows, and (b) it has a regular rectangular shape. Problems with this method include its strong assumption that the obstacle must be a vehicle and its dependency on correct road and/or lane detection.

In Massimo Bertozzi et al., Sensing of Automotive Environments Using Stereo Vision, 30th International Symposium on Automotive Technology and Automation (ISATA), Special Session on Machine Vision and Intelligent Vehicles and Autonomous Robots, pages 187-193, Florence, Italy, Jun. 16-19, 1997, an inverse perspective mapping (IPM) is used to obtain a top view of the road plane for each of two stereo cameras. The difference of the two remapped images shows the high rising obstacles off the road plane. This method requires more than one camera, and it cannot detect obstacles with small heights moving on the road.

In Heinrich Niemann et al., Integrated motion and geometry based obstacle detection in image sequences of traffic scenes, 10th Annual Symposium AeroSense '96, Orlando, Fla., 1996, a current image is back projected to a road plane in a three-dimensional world system using a current transformation between a camera and the real world. Vehicle movement information is applied to obtain the location of the road in the previous frame time. Then the road is mapped back to the image using the transformation in the previous frame. The registered image with ego-motion cancelled out is compared with the previous image to find obstacles. This method requires warping of the current frame image to a previous frame image with ego-motion correcting. This method also requires increased computation power. It also does not use information from other sensors in the vehicle, such as the front wheel angle to get more accurate vehicle movement status.

SUMMARY OF THE INVENTION

In one aspect of the present invention, a method for real-time obstacle detection from a vehicle moving relative to a road is provided. The method comprises calibrating an image capturing device, such that any image point can be mapped to a real-world point; receiving one or more images from the image capturing device; receiving information about the ego-motion of the image capturing device; selecting one or more real-world points according to a tractability criterion; applying a motion estimation method on the one or more real-world points, the one or more images, and the road to determine an image motion flow of the one or more real-world points; determining a true motion flow of the one or more real-world points based on the one or more real world points, the one or more images, and the ego-motion; and determining that the one or more real-world points is one or more obstacle points by comparing the image motion flow and the true motion flow.

In another aspect of the present invention, a system for real-time obstacle detection from a vehicle moving relative to a road is provided. The system comprises an image capturing device; means for calibrating an image capturing device, such that any image point can be mapped to a real-world point; means for receiving one or more images from the image capturing device; means for receiving information about the ego-motion of the image capturing device; means for selecting one or more real-world points according to a tractability criterion; means for applying a motion estimation method on the one or more real-world points, the one or more images, and the road to determine an image motion flow of the one or more real-world points; means for determining a true motion flow of the one or more real-world points based on the one or more real world points, the one or more images, and the ego-motion; and means for determining that the one or more real-world points is one or more obstacle points by comparing the image motion flow and the true motion flow.

In yet another aspect of the present invention, a machine-readable medium having instructions stored thereon for execution by a processor to perform a method for real-time obstacle detection from a vehicle moving relative to a road is provided. The method comprises calibrating an image capturing device, such that any image point can be mapped to a real-world point; receiving one or more images from the image capturing device; receiving information about the ego-motion of the image capturing device; selecting one or more real-world points according to a tractability criterion; applying a motion estimation method on the one or more real-world points, the one or more images, and the road to determine an image motion flow of the one or more real-world points; determining a true motion flow of the one or more real-world points based on the one or more real world points, the one or more images, and the ego-motion; and determining that the one or more real-world points is one or more obstacle points by comparing the image motion flow and the true motion flow.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Figure 1:
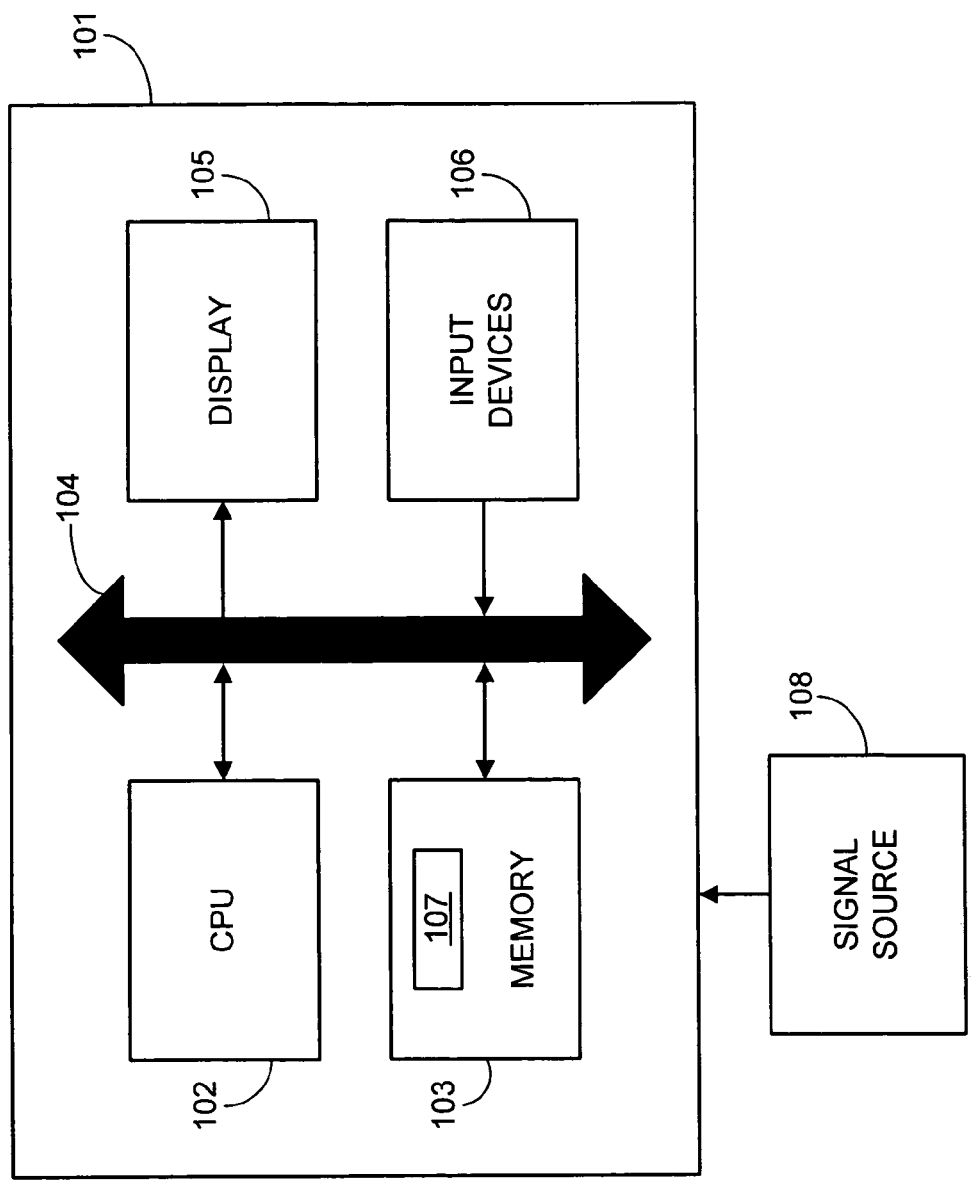
FIG. 1 shows a block diagram of a processor-based system, in accordance with one embodiment of the present invention.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Referring now to FIG. 1, according to an embodiment of the present invention, a computer system 101 for implementing the present invention can comprise, inter alia, a central processing unit (CPU) 102, a memory 103 and an input/output (I/O) interface 104. The computer system 101 is operatively coupled through the I/O interface 104 to a display 105 and various input devices 106 such as a mouse and keyboard. The computer system 101 may further comprise any of a variety of support circuits (not shown) such as such as cache, power supplies, clock circuits, and a communications bus. The memory 103 can include random access memory (RAM), read only memory (ROM), disk drive, tape drive, and the like, or a combination thereof. The present invention can be implemented as a routine 107 that is stored in memory 103 and executed by the CPU 102 to process the signal from the signal source 108. As such, the computer system 101 is a general purpose computer system that becomes a specific purpose computer system when executing the routine 107 of the present invention.

The computer system 101 also includes an operating system (not shown) and micro instruction code (not shown), which may be stored, for example, in the memory 103. The various processes and functions described herein may either be part of the micro instruction code or part of the routine 107 (or a combination thereof) which is executed via the operating system. In addition, various other peripheral devices (not shown) may be connected to the computer system 101 such as an additional data storage device and a printing device.

The basic principle of at least one embodiment of the present invention is as follows. A video camera is installed in a vehicle with known position and orientation. It is understood that any of a variety of image capturing devices may be used as is contemplated by those skilled in the art. The camera is calibrated such that any point in the real world (hereinafter "real-world point"), assuming its location is known, can be mapped to a point in the image captured by the camera (hereinafter "image point"). The road is assumed to be in an ideal plane and that road plane is known. When the vehicle moves, its movement information, such as velocity and angular velocity, is available from other sensors onboard. A variety of such sensors are known to those skilled in the art, such as a gyro and a Global Positioning System (GPS). The movement of the camera, i.e., its ego-motion, can be determined based on the movement information of the vehicle.

Based on the known ego-motion of the camera in reference to the known road plane, any real-world point on the road plane has a projected movement, which is commonly known as "true motion flow" or "geometric motion flow." The camera captures the actual movement of that point. From these camera images, we can compute the movement of the image point (i.e., the point on the image corresponding to the real-world point). This movement is commonly known as "image motion flow." If the movement of the real-world point and the image point match, we claim the point is in the road plane. Otherwise, we claim the point is either moving in the road plane or not in the road plane. Both are considered to be "obstacle points" indicating the potential for an obstacle. It should be noted that it is possible for an out-of-road-plane obstacle point to move in such a way that the real-world point and the image point match, which would falsely indicate that no obstacle is present, but such a situation is rarely seen in real road conditions.

We assume that an obstacle either lies on the road plane or does not lie on the road plane. Obstacles lying on a road plane move relative to the road (e.g., a moving car on a road moves relative to the road). Obstacles not on a road plane may be static (e.g., the top of an electric pole) or moving (e.g., a low flying bird in the sky). As a result, the motion field of the moving obstacle in the captured video would not match that of the road plane.

It is important to determine which image points and associated image motion flows are reliable. The video camera generates images in short intervals periodically. The timing of such intervals may be varied, as is understood by those skilled in the art. A motion estimation method can reliably compute the displacements of the points (i.e., the image motion flow) from consecutive images. An exemplary motion estimation method is the optical flow technique with statistical fusion described in U.S. patent application Ser. No. 10/681,702, entitled "Variable-Bandwidth Density-Based Fusion", filed Oct. 8, 2003, and assigned to the assignee of the present application. The full disclosure of the above-referenced patent application is hereby incorporated herein by reference. The reliability of points used to determine the image motion flow varies due to the nature of the nearby image patterns. For example, the image motion flow computed for a point in a homogeneous road patch is far less reliable than that for a corner point on a lane marker. The optical flow technique with statistical fusion described above is able to distinguish image points with reliable image motion flows from image points with unreliable flows. The unreliable flows are discarded. Thus, the output of applying the optical flow technique described above are the reliable image point locations and their associated image motion flows.

With a calibrated camera, any real-world point location can be mapped to a corresponding image point location. An image point location generally cannot be mapped to a corresponding a real-world point location because the ambiguity along the viewing ray of the camera usually cannot be resolved. However, if we know the image point is in a known plane, then the latter mapping is possible. Therefore, after the reliable image point locations are determined, we can determine the corresponding real-world point locations, assuming that the reliable image point locations are in the road plane.

If the reliable image motion flow and the true motion flow of a point match, then the point is considered to be fixed on the road plane and not a potential obstacle. If they do not match, then the point is considered to be an obstacle point, which indicates a potential obstacle either moving in the road plane, or not in the road plane at all.

A determination of whether an obstacle point indicates an actual obstacle may be determined over a period of time, as is contemplated by those skilled in the art. For example, evidence may be collected over a known period of time, and, if a point consistently has two mismatching flows, then an obstacle point (i.e., potential obstacle) can be considered to be an actual obstacle.

The method described herein is very fast and reliable. The image motion flow detection is based on a fast and reliable optical flow method with statistical fusion. The true motion flow calculation is analytical and fast, and it is accurate if the camera calibration, road plane information and vehicle sensors are accurate. Further, by verifying a mismatch over a period of time, the accuracy of determining whether an obstacle point indicates an actual obstacle increases, thus obtaining robust obstacle detection.

Figure 2:
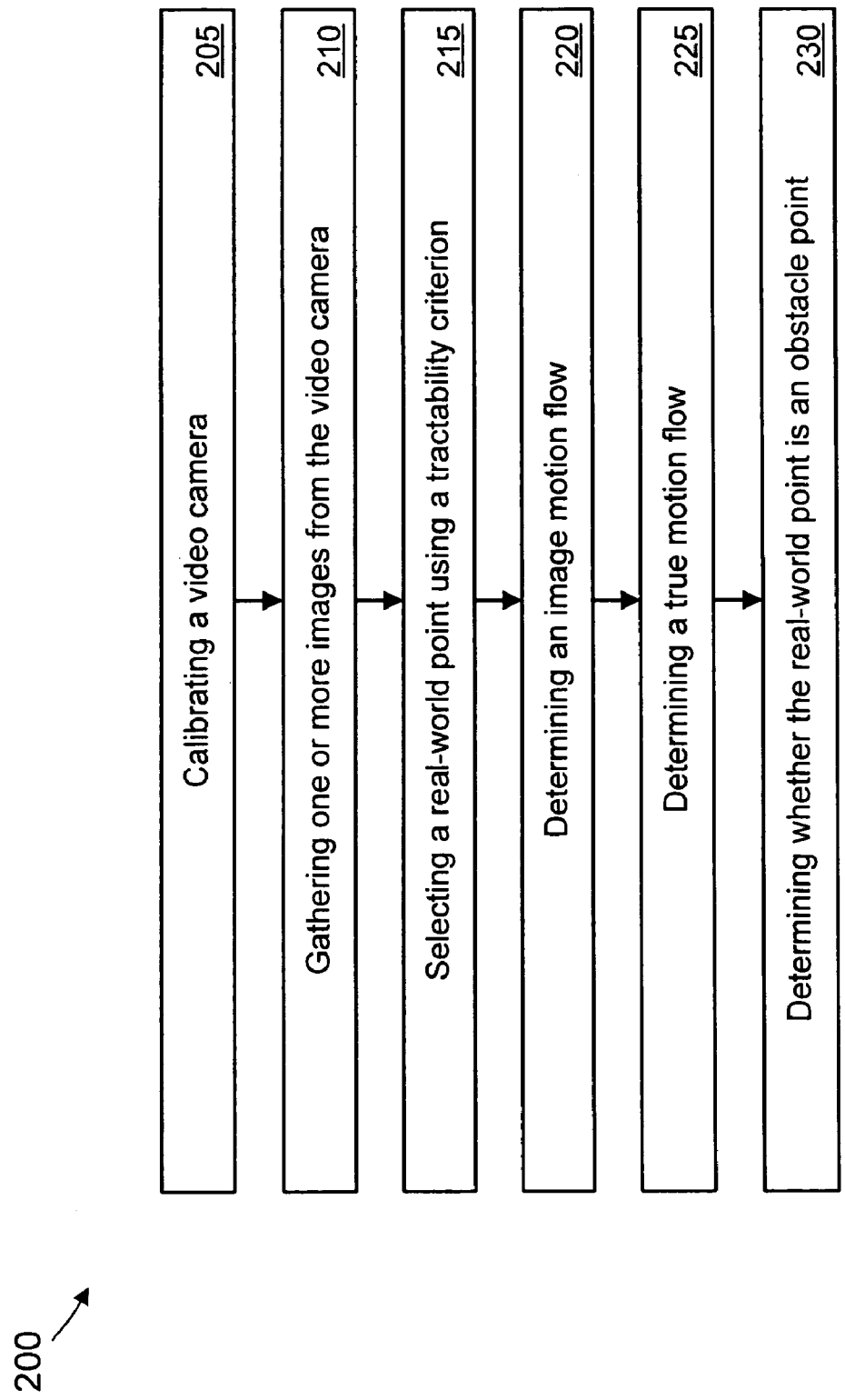
FIG. 2 shows a flow diagram of a method of real-time obstacle detection in accordance with one embodiment of the present invention.

Referring now to FIG. 2, a flow diagram 200 of one embodiment of the present invention is shown. In performing this method, the following are assumed. First, a road plane is known. Second, a moving vehicle is on the road plane moving relative to the road plane, and a video camera is operatively connected to the vehicle. For example, the video camera can be placed on the dashboard of the vehicle to capture images facing the front windshield (e.g., similar to what the driver or passenger of the moving vehicle would see). Third, the ego-motion of the video camera relative to the road plane is known as well. The ego-motion can be determined by using any one or combination of a variety of onboard vehicle sensors, as previously discussed. In an alternate embodiment, the ego-motion of the video camera can be determined by using a plurality of images gathered by the video camera.

The video camera with known ego-motion is calibrated (at 205). One or more images are gathered (at 210) from the video camera. A real-world point is selected (at 215) according to a tractability criterion. The tractability criterion may be inversely proportional with the uncertainty associated with localization of the real-world points. The optical flow technique described above is applied on the real-world point, the one or more images. and the known plane to determine (at 220) an image motion flow of the real-world point. A true motion flow of the real-world point is determined (at 225) from the real-world point, the one or more images, and the known ego motion. The true motion flow and image motion flow are compared to determine (at 230) whether the real-world point is an obstacle point. The real-world point may be considered an obstacle point if the image motion flow and the true motion flow do not match. The real-world point may considered not to be an obstacle point if the image motion flow and the true motion flow do match. The obstacle point determines a point of a potential obstacle. Over a particular interval of time, as is contemplated by those skilled in the art, if the real-world point is consistently determined to be an obstacle point, then the obstacle point may be considered to be an actual obstacle. If, over a particular interval of time, the real-world point is not consistently determined to be an obstacle point, then the obstacle point may be considered to not be an actual obstacle. Other criteria may be used to assist in determining whether an obstacle point is an actual obstacle, as is contemplated by those skilled in the art. For example, the close proximity of a plurality of obstacle points may further indicate the presence of an obstacle.

A theoretical analysis of the present invention, in accordance with one embodiment of the present invention, will now be described. The mapping of locations is as follows. The transformation between the world coordinates and the camera frame coordinates is:

$$P_c = R(P_w - T) \tag{1}$$

where, $P_w = (X_w, Y_w, Z_w)^T$ is the world coordinates, T is the displacement between origins of the two coordinate systems, R is the 3×3 rotation matrix between orientations of the two coordinate systems, and $P_c = (X_c, Y_c, Z_c)^T$ is the point in the camera frame. It should be noted that R effectively has only three free elements: the roll (rotation around the X axis), the pitch (rotation around the Y axis) and the yaw (rotation around the Z axis). R and T are camera extrinsic parameters, which map world coordinates into the camera reference frame.

We assume the image frame, camera frame and world frame have similar structure, i.e., the X axis points forward, the Y axis points to the left, and the Z axis points upward. According to a canonical camera model, the image coordinates $(Y_i, Z_i)^T$ are constrained by:

$$-(Y_i - o_y)s_y = f\frac{Y_c}{X_c} \tag{2}$$

$$-(Z_i - o_z)s_z = f\frac{Z_c}{X_c} \tag{3}$$

where $o_y, o_z, s_y, s_z$ and f are camera intrinsic parameters, which map the camera reference frame coordinates in the image plane.

If we define $$\begin{pmatrix} x_1 \\ x_2 \\ x_3 \end{pmatrix} = \begin{pmatrix} 1 & 0 & 0 \\ o_y & -\frac{f}{s_y} & 0 \\ o_z & 0 & -\frac{f}{s_z} \end{pmatrix} P_c \quad (4)$$

the pixel coordinates are:

$$y = Y_i = \frac{x_2}{x_1} \quad (5)$$

$$z = Z_i = \frac{x_3}{x_1} \quad (6)$$

By plugging Eq. (1) into Eq. (4), we get:

$$\begin{pmatrix} x_1 \\ x_2 \\ x_3 \end{pmatrix} = \begin{pmatrix} 1 & 0 & 0 \\ o_y & -\frac{f}{s_y} & 0 \\ o_z & 0 & -\frac{f}{s_z} \end{pmatrix} \begin{pmatrix} & & & -R_1^T T \\ R, & -R_2^T T \\ & & & -R_3^T T \end{pmatrix} \begin{pmatrix} X_w \\ Y_w \\ Z_w \\ 1 \end{pmatrix} \quad (7)$$

where $R_i^T$ is the ith row of the R matrix. This is the transformation of any world point to the image plane.

If the world points are on a plane, they satisfy the plane equation:

$$aX_w + bY_w + cZ_w = -d \quad (8)$$

Since we can choose the origin to avoid d=0, we use a normalized plane equation, $$aX_w + bY_w + cZ_w = A^T P_w = 1 \quad (9)$$

The Eq. (1) can be written as:

$$P_c = RP_w - RT = RP_w - RTA^T P_w = R(I - TA^T)P_w \quad (10)$$

By plugging Eq. (10) into Eq. (4), we get:

$$\begin{pmatrix} x_1 \\ x_2 \\ x_3 \end{pmatrix} = \begin{pmatrix} 1 & 0 & 0 \\ o_y & -\frac{f}{s_y} & 0 \\ o_z & 0 & -\frac{f}{s_z} \end{pmatrix} R(I - TA^T)P_w \quad (11)$$

If we define $$H = \begin{pmatrix} 1 & 0 & 0 \\ o_y & -\frac{f}{s_y} & 0 \\ o_z & 0 & -\frac{f}{s_z} \end{pmatrix} R(I - TA^T)P_w \quad (12)$$

then $$\begin{pmatrix} x_1 \\ x_2 \\ x_3 \end{pmatrix} = HP_w \quad (13)$$

H is the homography matrix to map a world plane to the image plane. We define the world coordinate system in this way: the origin is a fixed point in the vehicle and the orientation is fixed in regard to the vehicle, e.g., the X axis points to the front of the vehicle, the Y axis points to the left of the vehicle, and the Z axis points to the top of the vehicle. For clarity, we will call this the "vehicle coordinate system" if necessary in the following context, and the subscript will change to v instead of w. We further install the camera so that it is fixed on the vehicle. Therefore, R and T are fixed. If we assume the intrinsic camera parameters, $o_y, o_z, -f/s_y, -f/s_z$ do not change, and the normalized plane equation (i.e., Eq. (9)) holds in the vehicle coordinate system (i.e., A does not change), then H is constant.

For the last requirement that A does not change, the origin of the vehicle coordinate system can either move in a straight line or turn around the normal vector of the road plane in a plane parallel to the road plane. This restriction is reasonable for very smooth roads. Slow slopes of the road makes H only approximately correct. Quick slopes or vehicle rollovers violate the requirement. In the following, we will assume H is fixed over the time.

On the other hand, if we know the point in the image plane, we should be able to get the point in the world plane. H is normally not singular, or the camera would actually see the road plane as a line in the image, which is avoided in a real system setting. Then:

$$P_v = H^{-1} \begin{pmatrix} x_1 \\ x_2 \\ x_3 \end{pmatrix} = H^{-1} \begin{pmatrix} 1 \\ y \\ z \end{pmatrix} x_1 \quad (14)$$

Because $A^T P_v = 1$, $$x_1 = \frac{1}{A^T H^{-1} \begin{pmatrix} 1 \\ y \\ z \end{pmatrix}} \quad (15)$$

So:

$$P_v = \frac{1}{A^T H^{-1} \begin{pmatrix} 1 \\ y \\ z \end{pmatrix}} H^{-1} \begin{pmatrix} 1 \\ y \\ z \end{pmatrix} \quad (16)$$

Therefore, if we assume the image pixels correspond to points on the world plane, Eq. (16) gives the world point on the plane.

The mapping of velocities is as follow. The velocity of the world point in the road plane can be expressed as the derivative in regard to time t:

$$P'_v = \begin{pmatrix} X'_v \\ Y'_v \\ Z'_v \end{pmatrix} = \begin{pmatrix} \frac{dX_v}{dt} \\ \frac{dY_v}{dt} \\ \frac{dZ_v}{dt} \end{pmatrix} \quad (17)$$

Let us define $H_i^T$ as the ith row of H, then $$x_1 = H_1^T P \quad (18)$$

$$x_2 = H_2^T P \quad (19)$$

$$x_3 = H_3^T P_v \quad (20)$$

Now we need to establish the mapping of the image velocity and world velocity:

$$y' = \left(\frac{x_2}{x_1}\right)' = \left(\frac{H_2^T P_v}{H_1^T P_v}\right)' = \frac{H_2^T P'_v H_1^T P_v - H_2^T P_v H_1^T P'_v}{(H_1^T P_v)^2} \quad (21)$$

$$z' = \left(\frac{x_3}{x_1}\right)' = \left(\frac{H_3^T P_v}{H_1^T P_v}\right)' = \frac{H_3^T P'_v H_1^T P_v - H_3^T P_v H_1^T P'_v}{(H_1^T P_v)^2} \quad (22)$$

Similarly, if we know the image point and its velocity in the image plane, we can take the derivative of Eq. (16) to get the velocity of the point in the world.

$$P'_v = \left(\frac{H^{-1}\begin{pmatrix}1\\y\\z\end{pmatrix}}{A^T H^{-1}\begin{pmatrix}1\\y\\z\end{pmatrix}}\right)' = \frac{H^{-1}\begin{pmatrix}0\\y'\\z'\end{pmatrix}\left[A^T H^{-1}\begin{pmatrix}1\\y\\z\end{pmatrix}\right] - H^{-1}\begin{pmatrix}1\\y\\z\end{pmatrix}\left[A^T H^{-1}\begin{pmatrix}0\\y'\\z'\end{pmatrix}\right]}{\left[A^T H^{-1}\begin{pmatrix}1\\y\\z\end{pmatrix}\right]^2} \quad (23)$$

Previously, we established the mappings of the locations and velocities in the vehicle and the image coordinate systems. We still need to find out how the world moves viewing from the vehicle, i.e., the movement of the world in the vehicle coordinate system.

When the vehicle moves in a straight line at a known velocity $V_{v,w}$, each world point moves at $P'_v = -V_{v,w}$ in the vehicle coordinate system. Then for a pixel in the image plane, its correspondent world location in the vehicle coordinate system, $P_v$, can be computed through Eq. (16). Further, its true motion flow in the image can be computed readily from $P_v$ and $P'_v$ by use Eq. (21) and Eq. (22).

Figure 3:
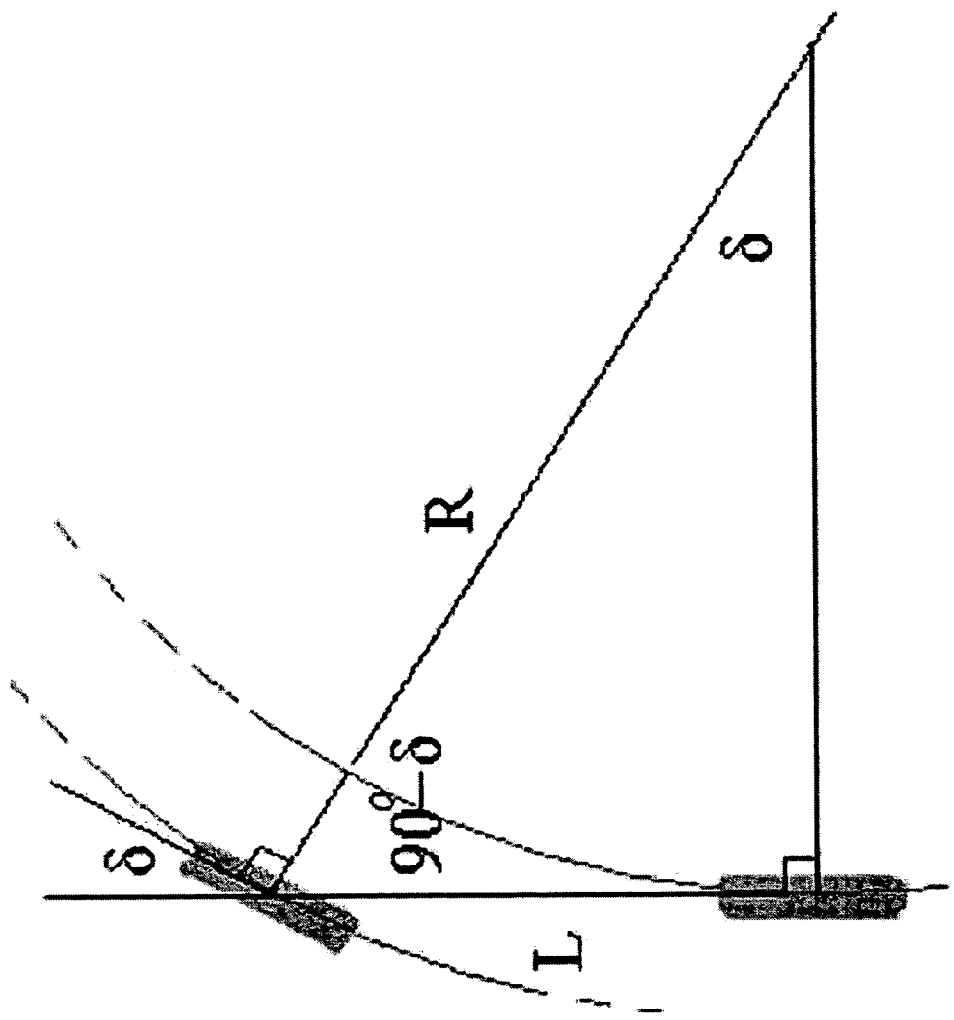
FIG. 3 shows a simplified model of a turning vehicle.

However, when the vehicle makes a turn, the velocity of the world point in the vehicle coordinate system is no longer homogenous. Let us consider pure in-plane rotations, i.e., the vehicle turns when it runs on the perfect plane and no skidding occurs. According to FIG. 3, the vehicle is simplified to two wheels: the (average) front wheel and the (average) rear wheel. The term "average" is used in the following sense. A four wheel vehicle is simplified to have two wheels only: the "average" front wheel at the center point between the two front wheels and the "average" rear wheel at the center point between the two rear wheels. The vehicle movement information is given according to the simplified vehicle model, e.g., the (average) front wheel speed, and the (average) front wheel angle. With known front wheel angle δ and wheel axle L, the front wheel turning radius is:

$$R = \frac{L}{\sin \delta} \quad (25)$$

If the physical front wheel speed $V_{f,w}$ is known, the angular speed is $V_{f,w}/R = V_{f,w} \sin \delta/L$. We denote ω as the angular velocity vector:

$$\omega = \begin{pmatrix} 0 \\ 0 \\ -\frac{V_{f,\omega} \sin \delta}{L} \end{pmatrix} \quad (26)$$

For any point $P_w$ on the vehicle, its velocity in regard to the rotation O is:

$$V_\omega = \omega \times (p_\omega - O) \quad (27)$$

Because the vehicle coordinate system is fixed with the vehicle orientation in regard to its origin $O_v$, any non-vehicle world point $P_w$ moves with a velocity $$V_v = (P_\omega - O) \times \omega \quad (28)$$

$$= (P_\omega - O_v - O) \times \omega \quad (29)$$

$$= (P_\omega - O_v) \times \omega - V_{v,\omega} \quad (30)$$

where $V_{v,\omega}$ is the velocity of the origin of the vehicle coordinate system in the real world. Notice that $P_\omega - O_v$ is actually the world point in the vehicle coordinate system. So, the velocity of a non-vehicle world point in the vehicle world system is $$V_v = P_v \times \omega - V_{v,\omega} \quad (31)$$

The non-rotational movement is a special case where ω=0 so $$V_v = -V_{v,\omega} \quad (32)$$

With Eq. (31), the velocity of the world point is known for turning cases, so its true image motion flow can easily be computed from Eq. (21) and Eq. (22).

We assume the origin is a point on the axle between the centers of the (average) front wheel and (average) rear wheel, with a distance pL to the center of the rear wheel. Similar to δ, the angle between the velocity of the origin and the X axis, β, can be computed as $$\beta = \arctan(p \tan \delta) \quad (33)$$

The (scalar) speed of the vehicle origin is $V_{v,\omega} = V_{f,\omega} \sqrt{\cos^2 \delta + p^2 \sin^2 \delta}$, so, $$V_v = \begin{pmatrix} X_v \\ Y_v \\ Z_v \end{pmatrix} \times \begin{pmatrix} 0 \\ 0 \\ -\frac{V_{f,\omega} \sin \delta}{L} \end{pmatrix} - \begin{pmatrix} V_{v,\omega} \cos \beta \\ -V_{v,w} \sin \beta \\ 0 \end{pmatrix} \quad (34)$$

-continued $$= V_{f,\omega} \begin{pmatrix} -\dfrac{Y_v}{L}\sin\delta - \sqrt{\cos^2\delta + p^2\sin^2\delta}\ \cos\beta \\ \dfrac{X_v}{L}\sin\delta + \sqrt{\cos^2\delta + p^2\sin^2\delta}\ \sin\beta \\ 0 \end{pmatrix} \quad (35)$$

For the special case of straight line movement, δ=0 and β=0, then $$V_v = \begin{pmatrix} -V_{f,\omega} \\ 0 \\ 0 \end{pmatrix} \quad (36)$$

If we simply put the origin of the vehicle coordinate system on the front wheel center, then p=1 and β=δ. Note that we need to change H because we use a different T. So, $$V_v = V_{f,\omega} \begin{pmatrix} -\dfrac{Y_v}{L}\sin\delta - \cos\delta \\ -\dfrac{X_v}{L}\sin\delta - \sin\delta \\ 0 \end{pmatrix} \quad (37)$$

Based on the theoretical analysis described above, the workings of the present invention will now be described, in accordance with one embodiment of the present invention.

We install the camera fixed on the vehicle, determine the vehicle coordinate system by putting the origin fixed on a point in the vehicle. Therefore, we know the rotation R and displacement T from the vehicle coordinate system to the camera frame. The relationship of the road plane to the vehicle coordinate system is also determined, i.e., A is established. Due to the way we select the vehicle coordinate system, A has the form of $(0,0,c)^T$. Then, the homography. H is easily computed from the camera intrinsic parameters, R, T and A, according to Eq. (12).

When we receive an image in the video from the camera, we can compute the image motion flow for selected points with high confidence, using sophisticated algorithms described elsewhere. At the same time, from what we know about the point, the location in the image plane y and z, we can compute the world point $P_v$ using Eq. (16). Eq. (35) or Eq. (37) gives $V_v$, the velocity of a world point in the vehicle coordinate system. So, plugging $P_v$ and $P'_v=V_v$ into Eq. (21) and Eq. (22), we get the true image motion flow of the point. Comparing the measured image motion flow with the computed true motion flow (which assumes it is a point on the road plane), we can check if the point is really a road point. As mentioned before, an obstacle point's image motion flow does not match the true motion flow computed assuming it is a road point, so the obstacle is detected.

Figure 4:
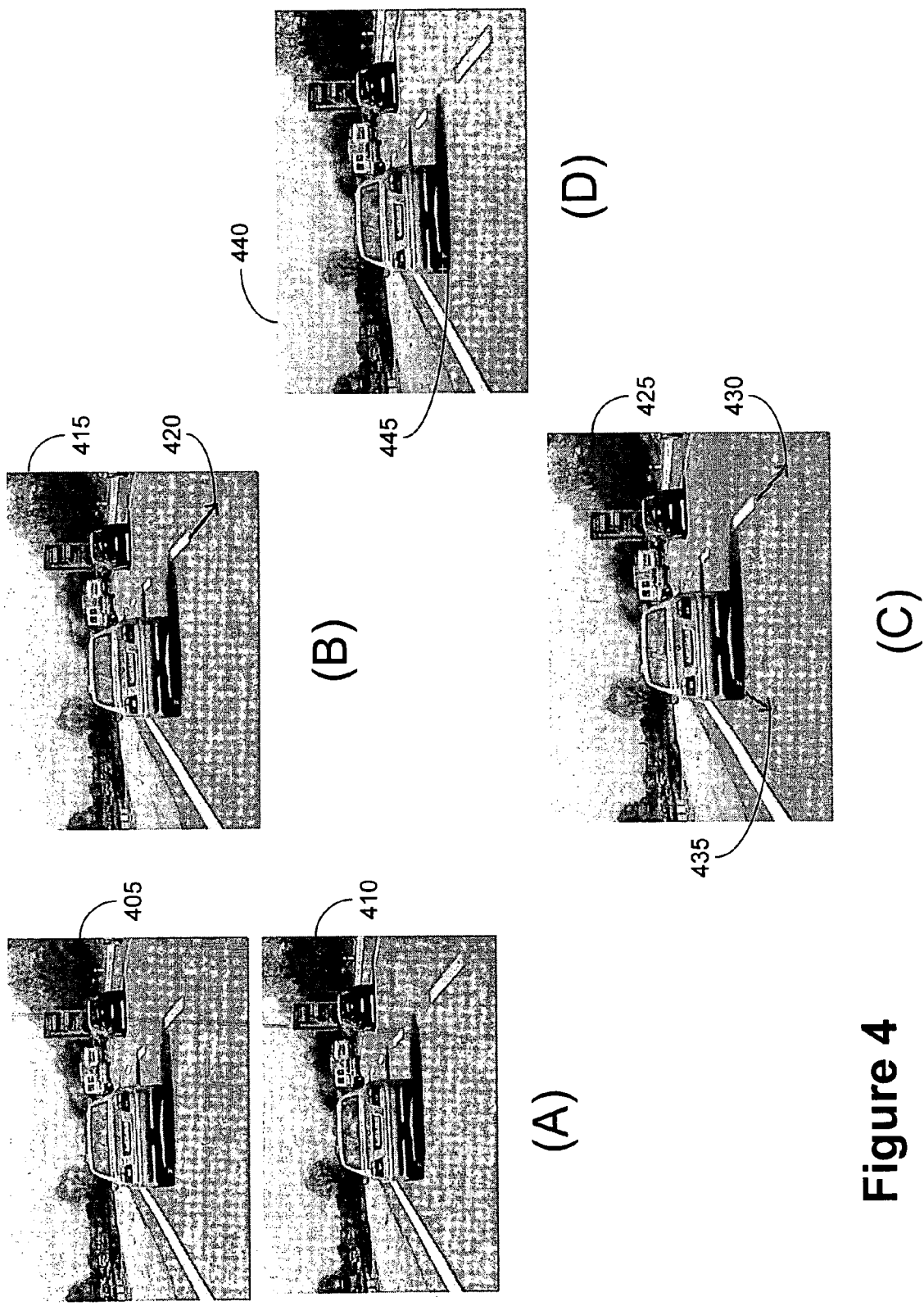
FIG. 4(A) shows images captured from an image capturing device, in accordance with one embodiment of the present invention.
FIG. 4(B) shows an image motion flow, in accordance with one embodiment of the present invention.
FIG. 4(C) shows a true motion flow, in accordance with one embodiment of the present invention.
FIG. 4(D) shows an output of a comparison between the image motion flow and the true motion flow, in accordance with one embodiment of the present invention.

Referring now to FIG. 4, an application of the method of FIG. 2 is illustrated, in accordance with one embodiment of the present invention. FIG. 4(a) shows two images 405, 410 captured from a calibrated video camera with known ego-motion relative to a known road plane. Second image 410 represents an elapsed time interval after first image 405. Although only two images 405, 410 are shown for the sake of simplicity, it is understood that any number of images may be gathered, as is contemplated by those skilled in the art. The two images 405, 410 may be sent to an image motion flow detection unit to determine the image motion flow.

FIG. 4(B) shows an exemplary image motion flow 415 with one reliable moving pattern 420. The reliable moving pattern 420 refers to the tip of a lane marker. More specifically, the reliable moving pattern 420 represents the tip of the lane marker moving from the first image 405 to the second image 410. Although only one reliable moving pattern 405 is shown, it is understood that the image motion flow detection unit may determine numerous reliable moving patterns 420 within the image motion flow. The image motion flow may be sent to a true motion flow detection unit.

FIG. 4(C) shows an exemplary true motion flow 425 with two road point movements: a lane marker movement 430 and a rear wheel movement 435. The two road point movements 430, 435 represent projected movements of the lane marker and the rear wheel, respectively. As previously described, these are determined using the known ego-motion of the camera. The image motion flow and the true motion flow may be sent to a comparison unit.

Figure 5:
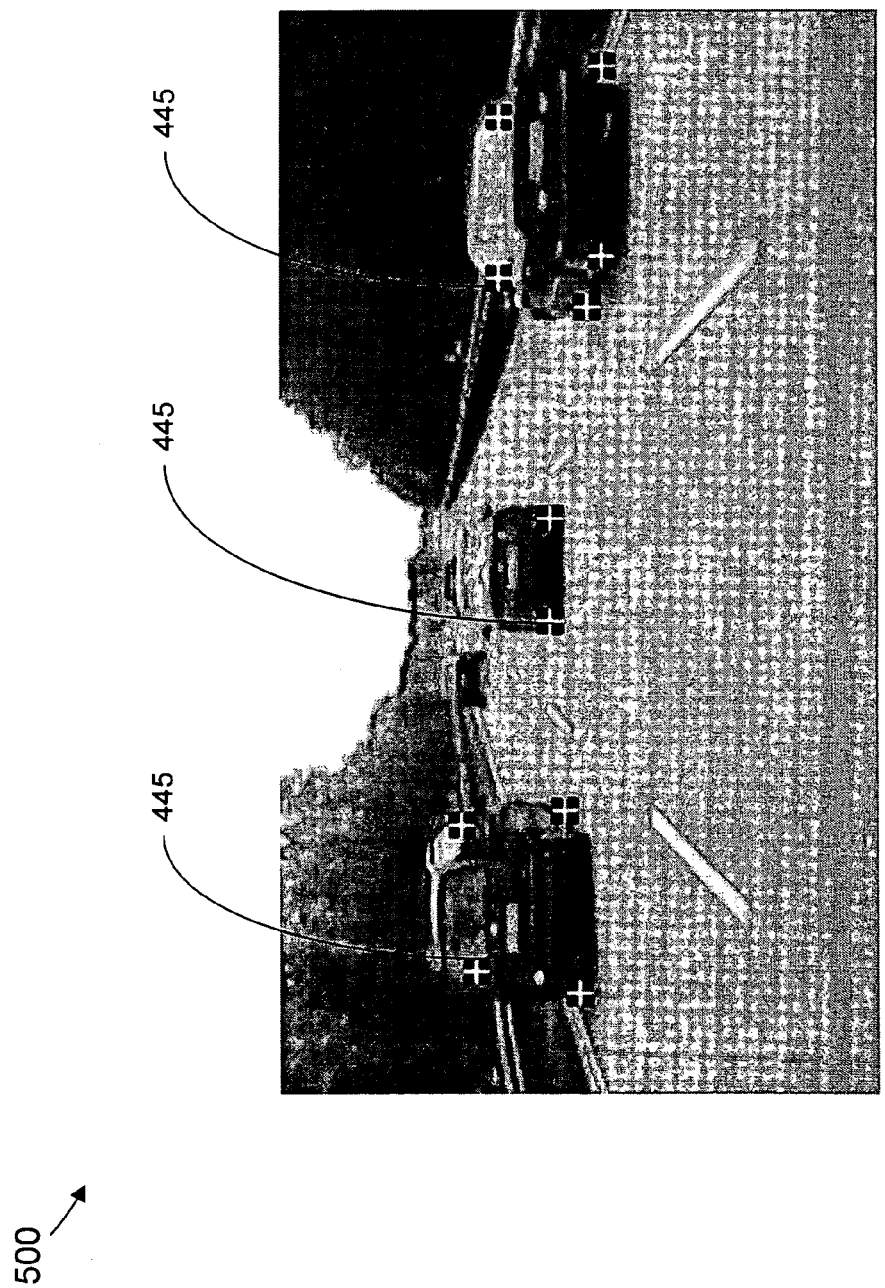
FIG. 5 shows an alternate output of a plurality of comparisons between the image motion flows and the true motion flows, in accordance with one embodiment of the present invention.

FIG. 4(D) shows an exemplary output 440 after comparing the image motion flow and the true motion flow. The reliable moving pattern 420 of FIG. 4(B) matches the lane marker movement 430 of FIG. 4(C); therefore, they are considered to not be an obstacle point. The rear wheel movement 435 of FIG. 4(C), on the other hand, does not have a respective match in the image motion flow 415 of FIG. 4(B). Therefore, the rear wheel movement 435 is represented in the output 440 as an obstacle point 445. In one embodiment, the obstacle point 445 may be determined after one iteration of the comparison unit. In an alternate embodiment, the obstacle point 445 may be determined after a plurality of iterations of the comparison unit to assure that the rear wheel movement 435 has no match in the image motion flow 415. FIG. 5 shows an alternate exemplary output 450 with a plurality of obstacle points 445.

It is understood that the present invention may be combined with any of a variety of known obstacle detection methods and systems. Such combinations may provide greater accuracy and/or more robust methods and systems. For example, the present invention may be combined with a radar, lidar, and ultrasonic obstacle detection systems and methods. Furthermore, once an obstacle point is determined to be an actual obstacle, the type of obstacle may be classified. For example, any of a variety of known classification methods may be used. It may be implemented using an automated classification system and/or a graphical user interface. The graphical user interface may allow human input to add greater accuracy to the classification process.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for real-time obstacle detection from a vehicle moving relative to a road, comprising:
   calibrating an image capturing device, such that any image point can be mapped to a real-world point;
   receiving one or more images from the image capturing device;

receiving information about the ego-motion of the image capturing device;

selecting one or more real-world points according to a tractability criterion inversely proportional with an uncertainty associated with localization of the real-world points;

applying a motion estimation method on the one or more real-world points, the one or more images, and the known plane to determine an image motion flow of the one or more real-world points;

determining a true motion flow of the one or more real-world points based on the one or more real world points, the one or more images, and the ego-motion; and determining that the one or more real-world points is one or more obstacle points by comparing the image motion flow and the true motion flow.

2. The method of claim 1, wherein applying a motion estimation technique comprises applying an optical flow method with statistical fusion.

3. The method of claim 2, wherein receiving information from the one or more sensors comprises receiving information from at least one of a gyro and a GPS.

4. The method of claim 1, wherein receiving information about the ego-motion of the image capturing device comprises receiving information from one or more sensors onboard the vehicle.

5. The method of claim 1, wherein receiving information about the ego-motion of the image capturing device comprises determining the information based on the one or more images.

6. The method of claim 1, wherein determining that the one or more real-world point is one or more obstacle points by comparing the image motion flow and the true motion flow comprises:

if the image motion flow does not match the true motion flow, determining that the one or more real-world points are one or more obstacle points; and if the image motion flow matches the true motion flow, determining that the one or more real-world points are not obstacle points.

7. The method of claim 1, further comprising:

tracking data of a plurality of instances of the one or more obstacle points over a time interval; and determining that the one or more obstacle points is one or more actual obstacles based on the data.

8. The method of claim 7, wherein determining that the one or more obstacle points is one or more actual obstacles based on the data comprises determining that the one or more obstacle points is one or more actual obstacles based on the data and information based on other detection methods.

9. The method of claim 8, wherein determining that the one or more obstacle points is one or more actual obstacles based on the data and information based on other detection methods comprises determining that the one or more obstacle points is one or more actual obstacles based on the data and information based on at least one of radar obstacle detection, lidar obstacle detection, and ultrasonic obstacle detection.

10. The method of claim 7, further comprising classifying a type of the one or more actual obstacles using automated detection.

11. The method of claim 7, further comprising classifying a type of the one or more actual obstacles using a graphical user interface.

12. The method of claim 1, wherein calibrating the image capturing device comprises calibrating a video camera.

13. A system for real-time obstacle detection from a vehicle moving relative to a road, comprising:

an image capturing device;

means for calibrating an image capturing device, such that any image point can be mapped to a real-world point;

means for receiving one or more images from the image capturing device;

means for receiving information about the ego-motion of the image capturing device;

means for selecting one or more real-world points according to a tractability criterion inversely proportional with an uncertainty associated with localization of the real-world points;

means for applying a motion estimation method on the one or more real-world points, the one or more images, and the road to determine an image motion flow of the one or more real-world points;

means for determining a true motion flow of the one or more real-world points based on the one or more real world points, the one or more images, and the ego-motion; and means for determining that the one or more real-world points is one or more obstacle points by comparing the image motion flow and the true motion flow.

14. The system of claim 13, wherein the image capturing device comprises a video camera.

15. The system of claim 13, further comprising:

means for tracking data of a plurality of instances of the one or more obstacle points over a time interval; and means for determining that the one or more obstacle points is one or more actual obstacles based on the data.

16. The system of claim 13, further comprising one or more onboard vehicle sensors for determining the ego-motion of the image capturing device.

17. The system of claim 16, wherein the one or more onboard vehicle sensors comprises a gyro sensor.

18. The system of claim 16, wherein the one or more onboard vehicle sensors comprises a GPS sensor.

19. A computer readable medium encoded with computer executable instructions for performing a method for real-time obstacle detection from a vehicle moving relative to a road, comprising:

calibrating an image capturing device, such that any image point can be mapped to a real-world point;

receiving one or more images from the image capturing device;

receiving information about the ego-motion of the image capturing device;

selecting one or more real-world points according to a tractability criterion inversely proportional with an uncertainty associated with localization of the real-world points;

applying a motion estimation method on the one or more real-world points, the one or more images, and the road to determine an image motion flow of the one or more real-world points;

determining a true motion flow of the one or more real-world points based on the one or more real world points, the one or more images, and the ego-motion; and determining that the one or more real-world points is one or more obstacle points by comparing the image motion flow and the true motion flow.

* * * * *